US008595571B2

(12) United States Patent
Yasuie et al.

(10) Patent No.: US 8,595,571 B2
(45) Date of Patent: Nov. 26, 2013

(54) ERROR DETECTION DEVICE, COMMUNICATION ERROR DETECTION SYSTEM, COMMUNICATION ERROR DETECTION METHOD

(75) Inventors: Takeshi Yasuie, Kawasaki (JP); Yuji Nomura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 281 days.

(21) Appl. No.: 13/110,112

(22) Filed: May 18, 2011

(65) Prior Publication Data

US 2011/0307768 A1 Dec. 15, 2011

(30) Foreign Application Priority Data

Jun. 9, 2010 (JP) .................................. 2010-132207
Mar. 17, 2011 (JP) .................................. 2011-059108

(51) Int. Cl.
*G01R 31/28* (2006.01)
*G01R 31/08* (2006.01)
*G21C 17/00* (2006.01)

(52) U.S. Cl.
USPC ........... 714/712; 702/185; 370/235; 370/245; 370/248

(58) Field of Classification Search
USPC ......... 714/712, 717, 819, 820, 821, 708, 704, 714/4, 3, 9, 10, 25, 31, 44, 56; 702/183, 702/185; 370/298, 230, 235, 242, 245, 250, 370/248
See application file for complete search history.

(56) References Cited

U.S. PATENT DOCUMENTS

| 8,174,996 | B2 * | 5/2012 | Omar ........................... 370/242 |
| 8,381,062 | B1 * | 2/2013 | Juels et al. .................... 714/752 |
| 2007/0258476 | A1 | 11/2007 | Habu et al. |
| 2010/0049460 | A1 | 2/2010 | Hasegawa et al. |
| 2013/0091398 | A1 * | 4/2013 | Djordjevic et al. ........... 714/752 |

FOREIGN PATENT DOCUMENTS

| WO | 2006/046309 | 5/2006 |
| WO | 2006/137373 | 12/2006 |

OTHER PUBLICATIONS

Masayoshi Kobayashi et al., "Estimating points of QoS deradation in the network from the aggregation of per-flow quality information", Technical Report of IEICE, Mar. 2005, pp. 31-36.

* cited by examiner

*Primary Examiner* — Christine Tu
(74) *Attorney, Agent, or Firm* — Staas & Halsey LLP

(57) ABSTRACT

An error detection device includes a control unit configured to identify two links that connects a relay communication device to two communication devices as a link pair, identify, from pluralities of inspection devices under the respective two links, a number of inspection devices corresponding to the number N of links where communication errors simultaneously occur (N is an integer of 1 or more) plus 1, determine (N+1) number of inspection flows between the (N+1) number of inspection device pairs, and generate inspection coverage information that includes the determined inspection flows. The error detection device includes a storage unit that stores the inspection coverage information, and a communication unit that sends the inspection coverage information to one device of the inspection device pairs.

20 Claims, 20 Drawing Sheets

FIG.9

| INSPECTION DEVICE | COMMUNICATION DEVICE |
|---|---|
| 200a | 20f |
| 200b | 20g |
| 200c | 20h |
| 200d | 20i |
| 200e | 20j |
| 200f | 20k |
| 200g | 20l |
| 200h | 20m |
| 200i | 20n |
| 200j | 20o |
| 200k | 20p |
| 200l | 20q |

FIG.10

| LINK | FIRST COMMUNICATION DEVICE | SECOND COMMUNICATION DEVICE |
|---|---|---|
| L1 | 20a | 20b |
| L2 | 20a | 20c |
| L3 | 20a | 20d |
| L4 | 20a | 20e |
| L5 | 20b | 20f |
| L6 | 20b | 20g |
| L7 | 20b | 20h |
| L8 | 20c | 20i |
| L9 | 20c | 20j |
| L10 | 20c | 20k |
| L11 | 20d | 20l |
| L12 | 20d | 20m |
| L13 | 20d | 20n |
| L14 | 20e | 20o |
| L15 | 20e | 20p |
| L16 | 20e | 20q |

FIG.12

| FLOW | PAIRS OF INSPECTION DEVICES | COMMUNICATION DEVICES |
|---|---|---|
| F11 | 200a↔200d | 20f↔20b↔20a↔20c↔20i |
| F12 | 200b↔200e | 20g↔20b↔20a↔20c↔20j |
| F13 | 200c↔200f | 20h↔20b↔20a↔20c↔20k |
| F14 | 200a↔200b | 20f↔20b↔20g |
| F15 | 200b↔200c | 20g↔20b↔20h |
| F16 | 200a↔200c | 20f↔20b↔20h |
| F17 | 200d↔200e | 20i↔20c↔20j |
| F18 | 200e↔200f | 20j↔20c↔20k |
| F19 | 200d↔200f | 20i↔20c↔20k |
| ‥ | ‥ | ‥ |

| INSPECTION DEVICES | DESIGNATED ROUTES |
|---|---|
| 200m⇔200u | 20v1⇔20s⇔20t⇔20v8 |
| 200n⇔200u | 20v2⇔20s⇔20t⇔20v8 |
| 200o⇔200u | 20v3⇔20s⇔20t⇔20v8 |
| 200p⇔200u | 20v4⇔20s⇔20t⇔20v8 |
| ... | ... |

| INSPECTION DEVICES | TIMES SELECTED |
|---|---|
| 200m | 3 |
| 200n | 2 |
| 200o | 1 |
| 200p | 1 |
| 200q | 5 |
| 200s | 2 |
| 200t | 4 |
| 200u | 1 |

960b

| INSPECTION DEVICES | TIMES SELECTED |
|---|---|
| 200m | 3 |
| 200n | 3 |
| 200o | 2 |
| 200p | 2 |
| 200q | 5 |
| 200s | 3 |
| 200t | 5 |
| 200u | 2 |

960c

| INSPECTION DEVICES | TIMES SELECTED |
|---|---|
| 200m | 3 |
| 200n | 3 |
| 200o | 2 |
| 200p | 2 |
| 200q | 6 |
| 200s | 3 |
| 200t | 4 |
| 200u | 2 |

ERROR DETECTION DEVICE, COMMUNICATION ERROR DETECTION SYSTEM, COMMUNICATION ERROR DETECTION METHOD

CROSS-REFERENCE TO RELATED APPLICATION

This application is based upon and claims the benefit of priority of the prior Japanese Patent Applications No. 2010-132207, filed on Jun. 9, 2010, and No. 2011-59108, filed on Mar. 17, 2011, the entire contents of which are incorporated herein by reference.

FIELD

The present invention relates to an error detection device, communication error detection system, communication error detection method, and program.

BACKGROUND

Known in the art is a method of detection of communication errors over a network by using monitoring devices. In such a detection method, for example, a plurality of monitoring devices which detect communication errors send and receive data and judge deterioration of the quality of data to thereby determine the links of the network at which errors occur. Note that, a "link" means a physical connection between components of a network.

The plurality of monitoring devices are arranged in the network to communicate test data between them and judge degradation of quality of data. Below, such communication of test data will be referred to as "inspection flows". However, the inspection flows between the plurality of monitoring devices pass through pluralities of links, so with a single inspection flow, while it might be learned that there is an error in one link through which the inspection flow passes, it is not possible to identify the link at which the degradation of quality of data occurred. A plurality of monitoring devices which differ in transmission locations and reception locations run inspection flows over the network so as to pass a link number of times. Thus, it is possible to identify a link at which degradation of quality of data occurred.

Further, when the number of inspection flows is not sufficient for the total number of links of a network, sometimes it is not possible to determine a failure link among the links through which inspection flows pass. For this reason, the method has been proposed of identifying the inspection flows which are required for identifying a failure link on a network.

As related art, there is the technical report of the Institute of Electronics, Information and Communication Engineers "Estimating points of QoS degradation in the network from the aggregation of per-flow quality information", March 2005, pp. 31 to 36.

SUMMARY

According to this disclosure, there is provided an error detection device which detects an error in communication in a network which has a plurality of communication devices, which error detection device is provided with a control unit which executes a routine which identifies a link pair by which a communication device acting as a relay between two communication devices is connected to the two communication devices, a routine which determines inspection flows, which are used for detection of an error in the network and in which the communication devices which are passed are identified, so that the number of link pairs which are passed becomes smaller, a routine which identifies pairs of inspection devices which send and receive the inspection flows which are determined, and a routine which generates inspection coverage information which identifies the inspection flows which are determined, a storage unit which stores the inspection coverage information, and a communication unit which sends the inspection coverage information to the inspection devices.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 9 is a view illustrating an example of device layout information;

FIG. 10 is a view illustrating an example of topology information;

FIG. 12 is a view illustrating an example of inspection coverage information;

FIG. 17 is a view illustrating an example of route information;

FIG. 19 is a view illustrating an example of device log information; and

DESCRIPTION OF EMBODIMENTS

Additional objects and advantageous of the disclosure will be set forth in part in the description which follows, and in part will be obvious from the description, or may be learned by practice of the invention. The object and advantages of the invention will be realized and attained by means of the elements and combinations particularly pointed out in the appended claims. It is to be understood that both the foregoing general description and the following detailed description are exemplary and explanatory only and are not restrictive of the invention, as claimed.

1. First Example of Communication Error Detection System

Figure 1:
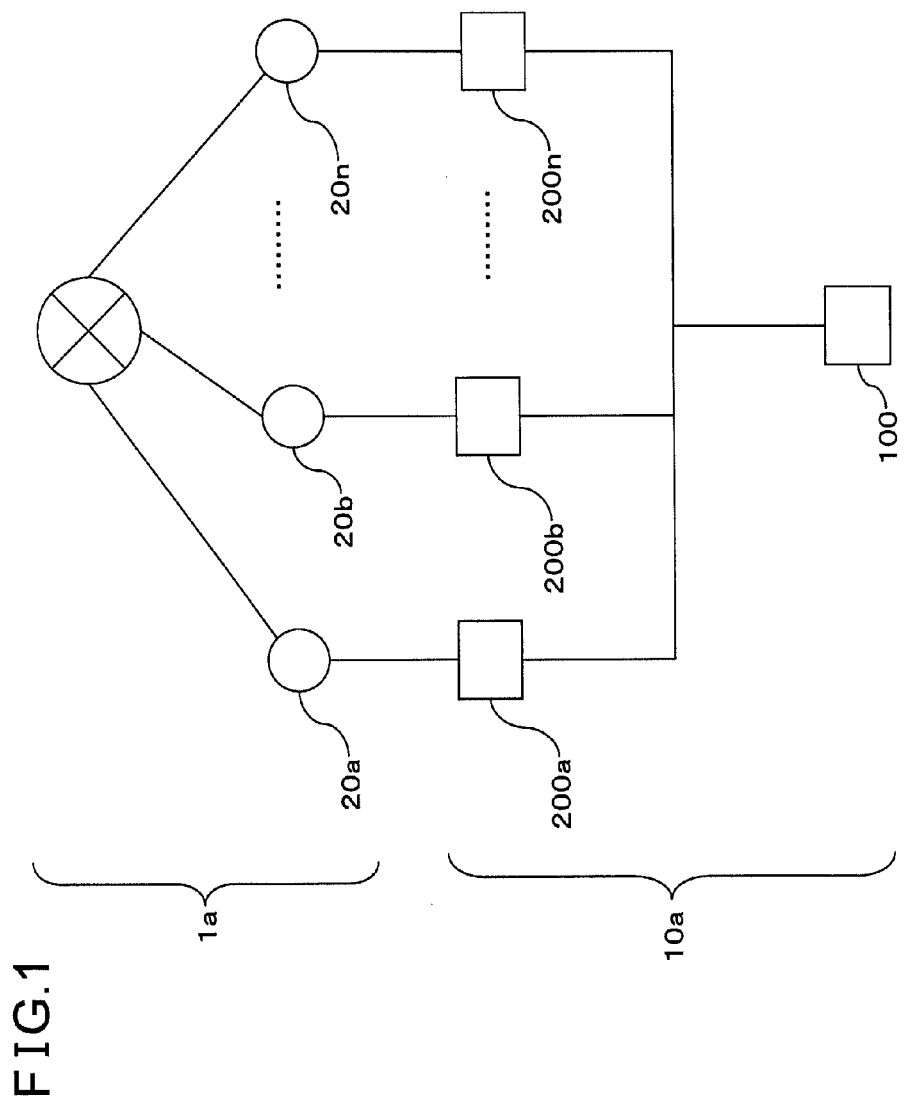
FIG. 1 is a view illustrating a first example of the configuration of a communication error detection system.

FIG. 1 is a view illustrating a first example of a communication error detection system. In the first example, both the configuration of the communication error detection system will be explained and the components of the system will be explained.

A communication error detection system 10a illustrated in FIG. 1 has an error detection device 100 and inspection devices 200a, . . . , 200n. A network 1a has a plurality of communication devices 20a, . . . , 20n. The inspection devices 200a, . . . , 200n connect with the communication devices 20a, . . . , 20n and communicate with other inspection devices through the communication devices. The error detection device 100 and the inspection devices 200a, . . . , 200n are connected to each other to communicate data. The number of the inspection devices provided in the communication error detection system and the number of communication devices connected with the inspection devices are not limited. Further, in FIG. 1, the error detection device 100 and the inspection devices 200a, . . . , 200n are connected by different lines than user communication, but they may also be connected by the same lines as the user communication.

The inspection devices 200a, . . . , 200n are devices which are arranged in the network and send and receive data for test use with each other as "inspection flows". Accordingly, the inspection devices 200a, . . . , 200n are either inspection devices of sources of the inspection flows or inspection devices of destinations of the inspection flows and form pairs of source inspection devices and destination inspection devices. The source inspection devices run inspection flows addressed to destination inspection devices in accordance with inspection coverage information 930 illustrated in FIG. 3 (explained later), which the error detection device 100 generates and transmits. The destination inspection devices receive the inspection flows and send the received data as inspection results to the error detection device 100. Note that, a single inspection device may also be given both the function as a source inspection device and the function as a source inspection device.

The error detection device 100 executes processing for determination of the inspection flows. The processing for determination of the inspection flows determines the inspection flows for detecting an error in communication in the network and generates inspection coverage information 930. Further, the error detection device 100 transmits the inspection coverage information 930 to the inspection flow source inspection device. The error detection device 100 receives the results of the inspection flows from the destination inspection device, judges the degradation of quality of the received data, and determines a link with an error. The judgment of the degradation of quality of data for inspection use by the error detection device 100 may, for example, be performed by comparing the delay jitter, delay increase, packet loss, etc. after transmission of the test data with those before transmission of the test data.

1.1. First Example of Error Detection Device

Figure 2:
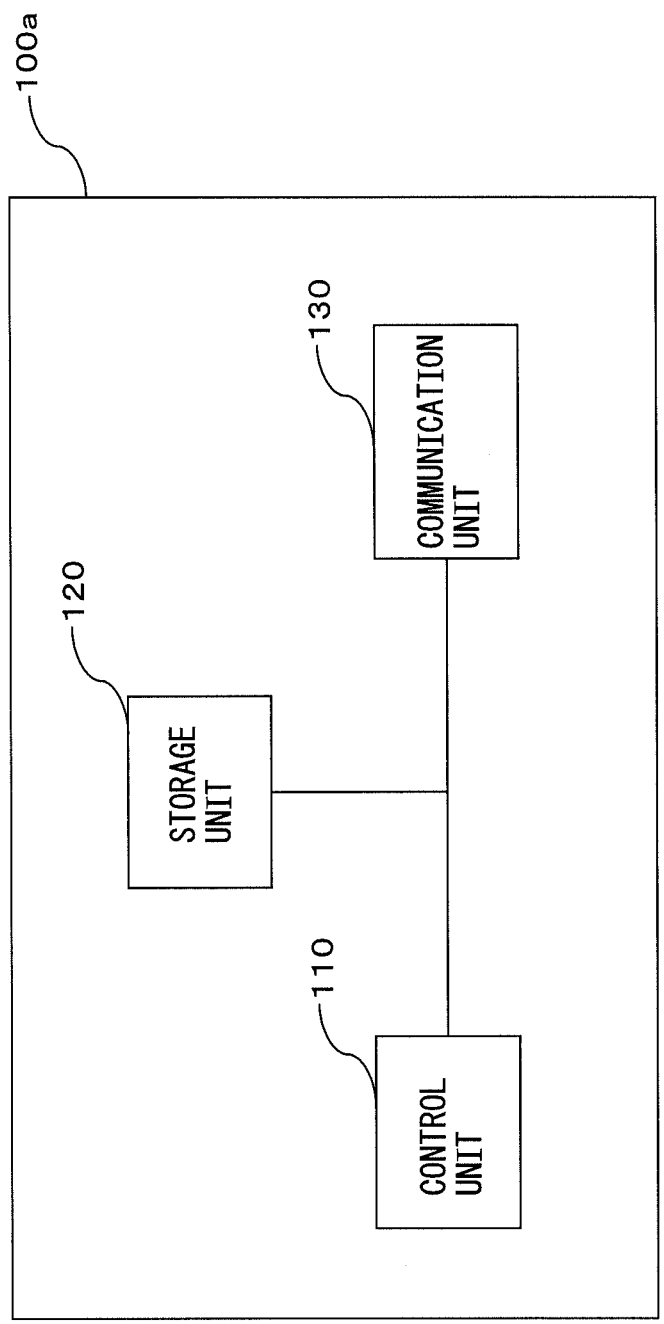
FIG. 2 is a view illustrating a first example of an error detection device.
Figure 3:
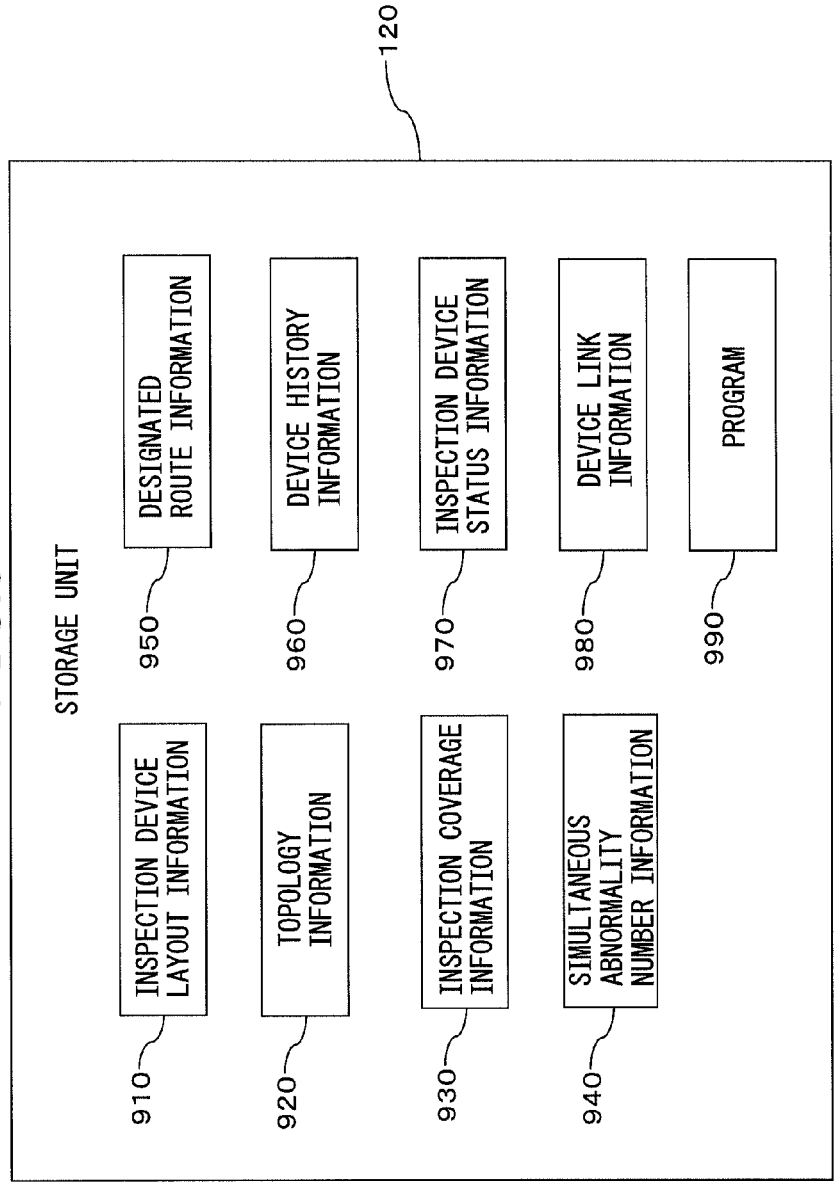
FIG. 3 is a view illustrating one example of information stored in a storage unit of an error detection device.

FIG. 2 is a view illustrating a first example of an error detection device. The first example of the error detection device, that is, the error detection device 100a, has a control unit 110, storage unit 120, and communication unit 130. FIG. 3 is a view illustrating one example of the information stored in the storage unit 120. Below, referring to FIG. 2 and FIG. 3, the error detection device will be explained.

The storage unit 120 of the error detection device 100a stores device layout information 910, topology information 920, inspection coverage information 930, simultaneous error number information 940, designated route information 950, device log information 960, inspection device status information 970, device link information 980, and a program 990. The device layout information 910 is information for indicating the inspection devices and the communication devices to which the inspection devices are connected. The topology information 920 is information for indicating the links and the two communication devices connected by the links. The control unit 110 uses the topology information 920 to recognize the network topology and uses the device layout information 910 to recognize which inspection devices the communication devices inside the network topology are connected to.

The inspection coverage information 930 is information including inspection flows which the control unit 110 identifies by the processing for determination of inspection flows. The control unit 110 controls the communication unit 130 so as to send the inspection coverage information 930 to the source inspection device determined by each inspection flow in the inspection coverage information 930.

The simultaneous error number information 940 is information which defines the number of communication errors which simultaneously occur in the network. The simultaneous error number information 940 will be discussed below in connection with FIG. 11.

The designated route information 950 is information which defines the relationship between a route which is designated in the network and inspection devices which are arranged at the ends of the designated route. The designated route information 950 will be discussed below in connection with FIG. 16.

The device log information 960 is log information which stores, for each inspection device, the number of times the error detection device 100 selected the inspection device as an inspection device for sending or receiving an inspection flow. The device log information 960 will be discussed below in connection with FIG. 19.

The inspection device status information 970 is information for management of the status information of the inspection devices. The device link information 980 is information which defines the correspondence information of the inspection devices and the links managed by the inspection devices. The inspection device status information 970 and the device link information 980 will be discussed below in connection with FIG. 20.

The program 990 is a program which makes a control unit 110 of the error detection device 100 run the processing for determination of inspection flows and processing for judgment of failure links.

In the processing for determination of inspection flows, the control unit 110 determines the inspection flows, registers the determined inspection flows in the inspection coverage information 930, and uses the communication unit 130 to send the inspection coverage information 930 to the source inspection devices related to the inspection flows.

In the processing for judgment of failure links, the control unit 110 analyzes the inspection data which is received from the destination inspection devices so as to judge the degradation of quality of data and performs processing for judging the failure links causing the degrading of quality of data. Note that, details of the processing for determination of inspection flows and the processing for judgment of failure links will be discussed below in connection with FIG. 14 and FIG. 15 respectively.

The communication unit 130 receives a command from the control unit 110, sends the inspection coverage information 930 through the network to a source inspection device, or receives the results of the inspection flow which was acquired from a destination inspection device through the network, that is, the received data. The communication unit 130 sends the received data to the control unit 110.

1.2. Second Example of Error Detection Device

Figure 4:
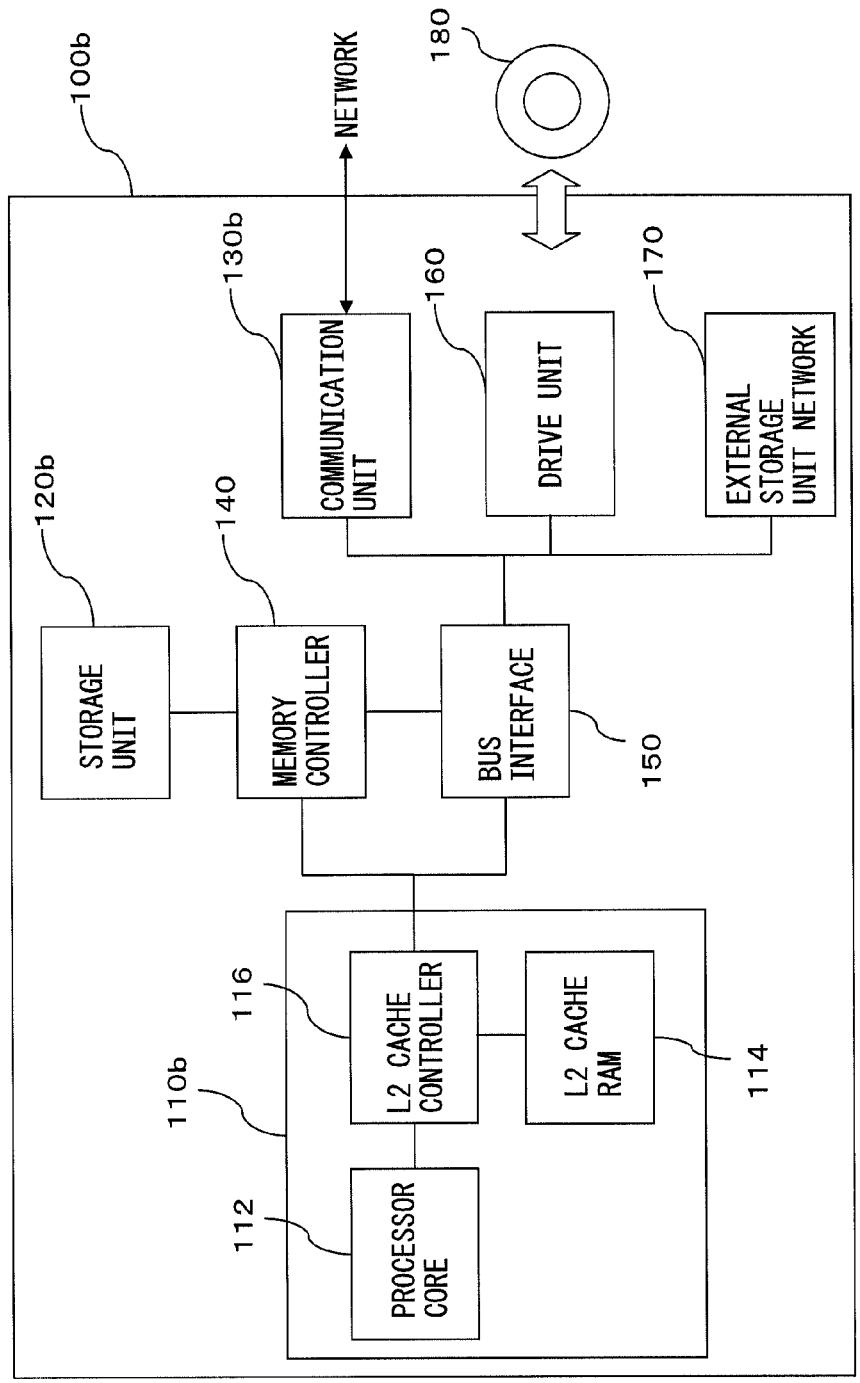
FIG. 4 is a view illustrating a second example of an error detection device.

FIG. 4 is a view illustrating a second example of an error detection device. The error detection device 100b illustrated in FIG. 4 has a control unit 110b, storage unit 120b, memory controller 140, bus interface 150, drive unit 160, external storage unit 170, and communication unit 130b. The control unit 110b, storage unit 120b, and communication unit 130b illustrated in FIG. 4 respectively correspond to the control unit 110, storage unit 120, and communication unit 130 illustrated in FIG. 2 and can realize the functions of the corresponding components in FIG. 2.

The control unit 110b has a processor core 112, an L2 cache (secondary cache) RAM (random access memory) 114, and an L2 cache controller 116 which controls the L2 cache RAM 114. The control unit 110b is connected to the storage unit 120b through a memory controller 140. Further, the control unit 110b is connected through a bus interface 150 to a drive unit 160, external storage unit 170, and communication unit 130b.

The L2 cache RAM 114 stores part of the content which is stored in the storage unit 120 in accordance with a command from the processor core 112. The L2 cache RAM 114 is a storage device comprised of a semiconductor device, for example, is an SRAM (static random access memory). The processor core 112 reads out data or commands from the L2 cache RAM 114, processes the data in accordance with the commands, and stores the processing results in the L2 cache RAM 114 or storage unit 120b. The commands or data are stored as the program 990 in the storage unit 120b. The control unit 110b may also be a multicore processor which carries several processor cores 112. The control unit 110b is, for example, a CPU (central processing unit). The memory controller 140 receives load instructions from the control unit 110b or bus interface 150, loads data or instructions from the storage unit 120b, and outputs them to the control unit 110b or bus interface 150. The memory controller 140, further, receives store instructions and covered data from the control unit 110b or bus interface 150 and stores the received data in the storage unit 120b.

The storage unit 120b is a storage device which is comprised of a semiconductor device, for example, a DRAM (dynamic random access memory). The external storage unit 170 is a nonvolatile storage device which a larger storage capacity than the storage unit 120b and not losing data even when no longer supplied with power, for example, a disk array having magnetic disks or an SSD (solid state drive) using a flash memory. The external storage unit 170 can store commands, data, and programs which are to be stored in the storage unit 120b.

The bus interface 150 is a bus which connects the control unit 110b and other connected devices. The bus interface 150, for example, is a circuit which functions in accordance with the AGP (Accelerated Graphics Port) or PCI Express (Peripheral Component Interconnect Express) or other specifications.

The drive unit 160 is, for example, a device which reads and writes data to and from a floppy disk, CD-ROM (compact disc read only memory), DVD (digital versatile disc), or other storage medium 180. The drive unit 160 includes a motor which spins the storage medium 180 and a head which reads and writes data to and from the storage medium 180. Note that, the storage medium 180 can store the program 990. The drive unit 160 reads out the program 990 from the storage medium 180 which is set in the drive unit 160. The control unit 110b stores the program 990 which is read out from the drive unit 160 in the storage unit 120b and/or external storage unit 170.

The communication unit 130b is a device which is connected to the network and which communicates with communication devices and inspection devices which are connected to the network. The communication unit 130b is, for example, an NIC (network interface controller).

1.3. Example of Inspection Device

Figure 5:
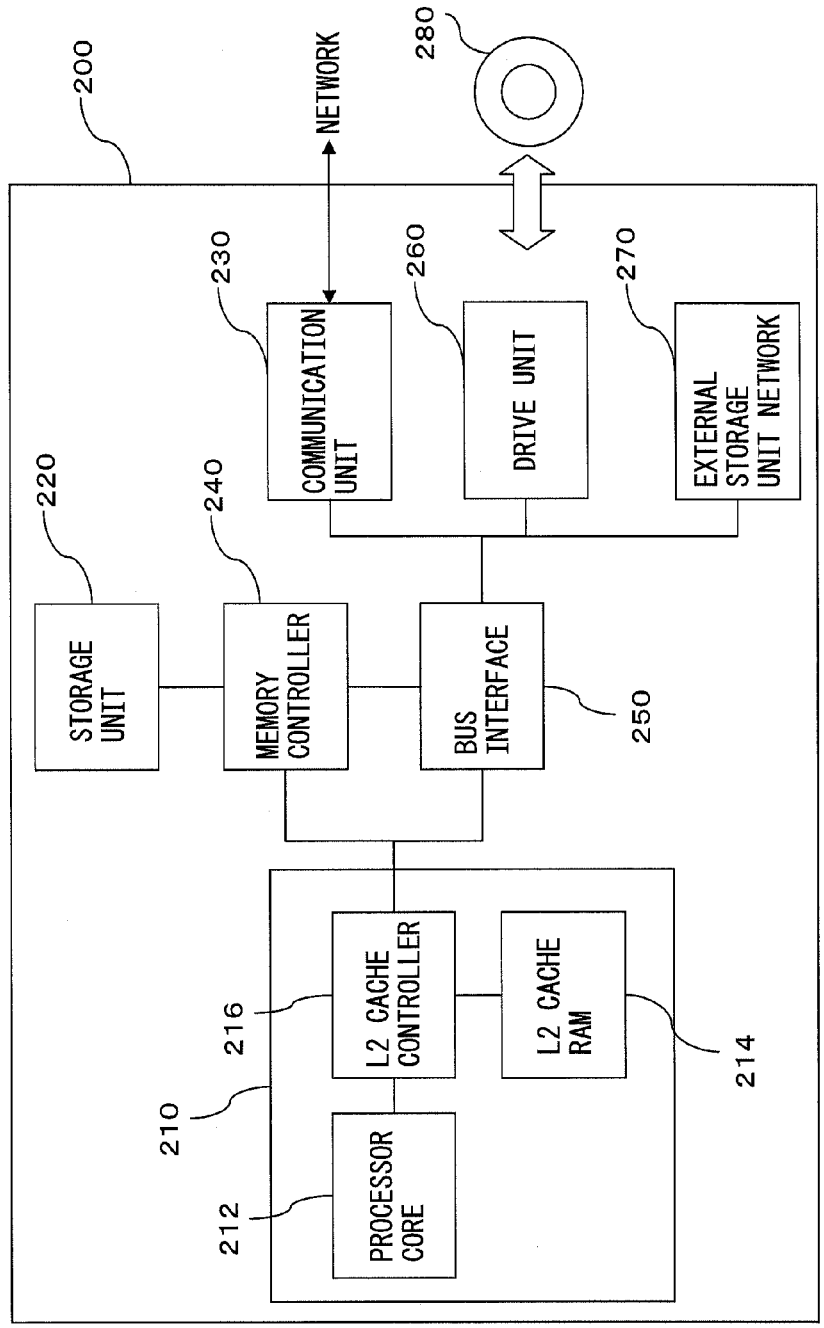
FIG. 5 is a view illustrating an example of an inspection device.

FIG. 5 is a view illustrating one example of an inspection device. The inspection device 200 illustrated in FIG. 5 has a control unit 210, storage unit 220, memory controller 240, bus interface 250, drive unit 260, external storage unit 270, and communication unit 230. The control unit 210 has a processor core 212, an L2 cache (secondary cache) RAM (random access memory) 214, and an L2 cache controller 216 which controls the L2 cache RAM 214. The above components of the inspection device 200 can be ones which have the same functions as the components of the same name in the error detection device 100 illustrated in FIG. 4, so explanations are omitted.

Figure 6:
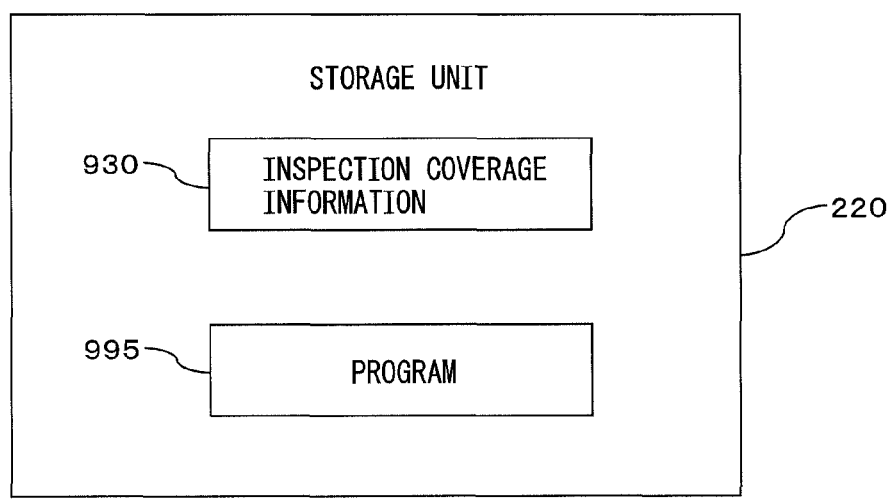
FIG. 6 is a view illustrating an example of information stored in a storage unit of an inspection device.

FIG. 6 is a view illustrating one example of information stored in the storage unit of the inspection device. The storage unit 220 of the inspection device 200, as illustrated in FIG. 6, has inspection coverage information 930 and a program 995. The inspection coverage information 930 is information including an inspection flow, which is received from the error detection device 100. Based on the inspection coverage information 930, the program 995 implements a system in which an inspection device 200 is set as a source and an inspection flow is transmitted to the source inspection device 200, or the inspection device 200 is set as a destination and an inspection flow is received to the destination inspection device 200 and transmitted from the destination inspection device 200 to the error detection device.

As explained in connection with FIG. 4 and FIG. 5, the error detection device 100 and the inspection device 200 may be the same hardware configuration. When one inspection device 200 stores both the program 990 for the error detection device and the program 995 for the inspection device 200 in the storage unit 220, if the inspection device 200 runs the program 990, the inspection device 200 functions as the error detection device 100. The storage unit 220 may receive and store the programs 990, 995 through a network or a storage medium. Therefore, the error detection device 100 given below may be understood as one inspection device 200 functioning as the error detection device 100.

1.4. Example of Communication Device

Figure 7:
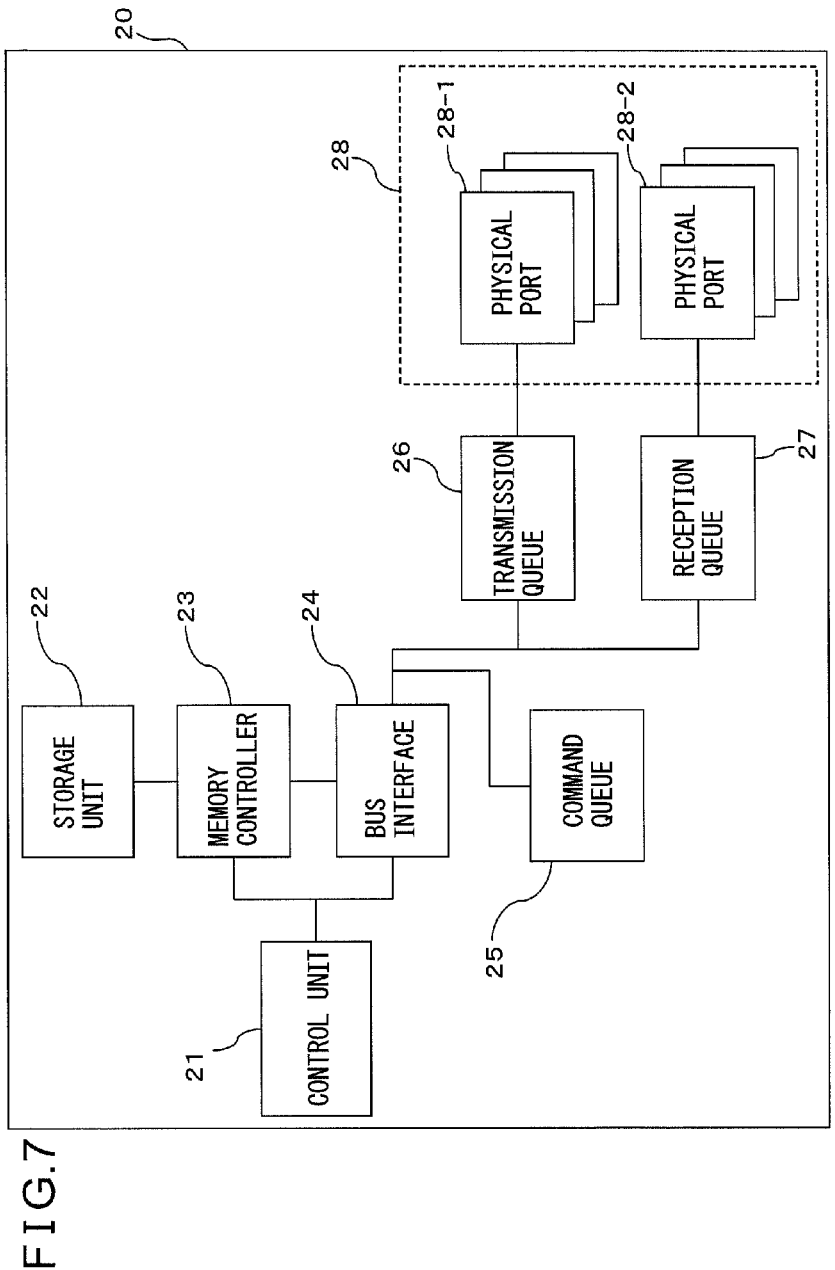
FIG. 7 is a view illustrating an example of the configuration of a communication device.

FIG. 7 is a view illustrating one example of a communication device. The communication device 20 has a control unit 21, storage unit 22, memory controller 23, bus interface 24, command queue 25, reception queue 27, transmission queue 26, and physical ports 28.

The control unit 21 runs a communication program which is stored in the storage unit 22 so as to realize a communication processing function based on a predetermined protocol. The predetermined protocol is, for example, the Ethernet® or TCP/IP (Transmission Control Protocol/Internet Protocol).

The communication processing function which the control unit 21 realizes reads a command which is held in the command queue 25. The control unit 21 obtains data from the position of the storage unit 22 which is identified by the memory address contained in the command and transfers the obtained data to the network. Further, the control unit 21 acquires data which is held in the reception queue 27 and a command identifying the data and stores the data at the position of the storage unit 22 which is identified by the memory address contained in the command.

The storage unit 22, memory controller 23, and bus interface 24 of the communication device have the same functions as the storage unit 120b, memory controller 140, and bus interface 150 of the error detection device 100 illustrated in FIG. 4, so explanations will be omitted.

The physical ports 28 include pluralities of physical ports which are connected to the network cables and input and output data with the network. For example, the physical port 28-1 operates as a reception-use physical port and receives as input data which is sent from the outside. The input data is held at the reception queue 27. The physical port 28-2 operates as a transmission-use physical port and outputs data. The transmission data is held at the transmission queue 26.

The storage unit 22 stores a routing table which includes information linking the physical ports and IP addresses and/or MAC (media access control) addresses. The control unit 21 runs a communication program which is stored in the storage unit 22 to realize a communication processing function based on a predetermined protocol and refers to the routing table to perform routing. The "routing", for example, refers to the routing table, investigates the destination address of the data which was received from a certain reception-use physical port 28-1, and sends the received data to the transmission-use physical port 28-2 which is connected to the communication device of the destination address.

The control unit 21 reads a command which is held at the command queue 25, acquires data from the position of the storage unit 22 which is identified by the memory address which is contained in the command, and transfers the data to the destination inspection device. Further, the control unit 21 acquires data which is held in the reception queue 27 and a command which is held in the command queue 25 and stores the data at a position of the storage unit 22 which is identified by the memory address which is contained in the command.

The communication device illustrated in FIG. 7 may also provide both the function of the error detection device 100 and/or the function of the inspection device 200. When the communication device realizes the function of the error detection device 100, the storage unit 22 of the communication device 20 stores the information illustrated in FIG. 3, while the control unit 21 runs the program 990 illustrated in FIG. 3 so as to realize the function of the error detection device 100. Further, when the communication device realizes the function of the inspection device 200, the storage unit 22 of the communication device 20 stores the information illustrated in FIG. 6, while the control unit 21 runs the program 995 illustrated in FIG. 6 so as to realize the function of the inspection device 200. The storage unit 22 may receive and store the programs 990 and 995 through a storage medium or the network.

Above, the error detection device, inspection devices, and communication devices configuring the communication error detection system in accordance with the first example of the configuration of the communication error detection system were explained. In another example of the communication error detection system illustrated below, it is assumed that the error detection device, inspection devices, and communication devices which were explained in the first example are applied.

2. Second Example of Communication Error Detection System

Figure 8:
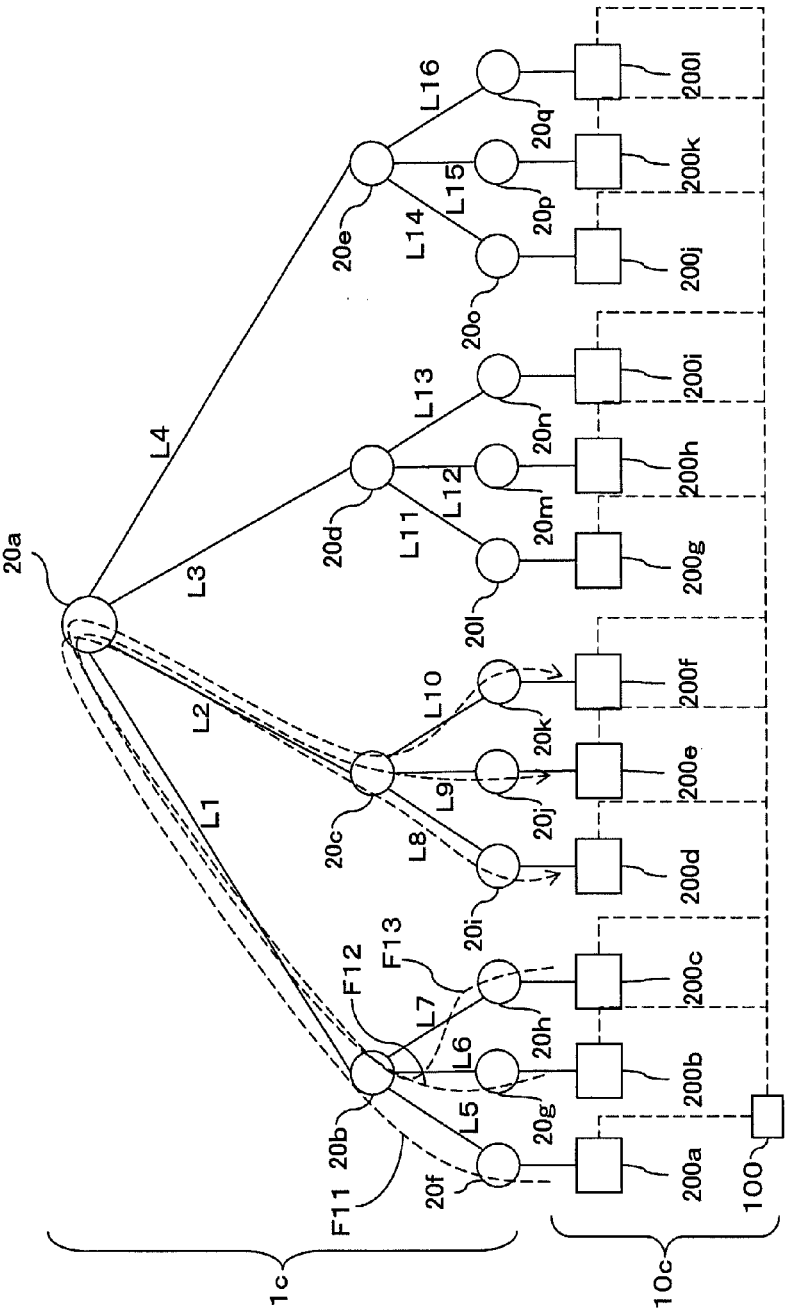
FIG. 8 is a view illustrating a second example of the configuration of a communication error detection system.

FIG. 8 is a view illustrating a second example of a communication error detection system. In the second example, the system configuration will be discussed. One example of the device layout information 910c, topology information 920c, inspection coverage information 930c, processing for determination of inspection flows, and processing for judgment of failure links will be discussed.

The communication error detection system 10c illustrated in FIG. 8 has an error detection device 100 and inspection devices 200a to 200l. The network 1c has a plurality of communication devices 20a to 20q. The inspection devices 200a to 200l are connected to the communication devices 20f to 20q.

As illustrated in FIG. 8, the network 1c is a hierarchical network and has, at its topmost first layer, the communication device 20a, at its second layer, the communication devices 20b to 20e, and, at 20b to 20e, and at its third layer, the communication devices 20f to 20q.

The communication device 20a is a communication device which acts as a relay between any two of the communication devices 20b to 20e.

2.1. Device Layout Information

FIG. 9 is a view illustrating an example of the device layout information. The device layout information 910c illustrated in FIG. 9 has an "inspection device" column 912c and a "communication device" column 914c. The device layout information 910c has the connection relationship of the inspection devices and communication devices illustrated in the network 1c of FIG. 8. In the device layout information 910c, an inspection device and a communication device which are entered into the same entry (row), as illustrated in FIG. 9, is an inspection device and communication device related by connection by a link.

2.2. Topology Information

FIG. 10 is a view illustrating one example of the topology information. The topology information 920c illustrated in FIG. 10 has a "link" column 922c, "first communication device" column 924c, and "second communication device" column 926c. The "link" column 922c has the links illustrated in the network 1c of FIG. 9, while the "first communication device" column 924c and the "second communication device" column 926c have the communications devices which are arranged at the two ends of the links illustrated in the same entries.

2.3. Simultaneous Error Number Information

Figure 11:
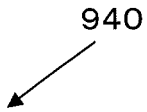
FIG. 11 is a view illustrating an example of simultaneous error number information.

FIG. 11 is a view illustrating one example of the simultaneous error number information. As illustrated in FIG. 11, the inspection coverage information 930 includes the number of simultaneous occurrences of errors. In the example of FIG. 11, the number of simultaneous occurrences of errors is "2". The "number of simultaneous occurrences of errors" is the number of links with communication errors which simultaneously occur in a network.

2.4. Determination of Inspection Flows Considering Number of Simultaneous Occurrences of Abnormalities The error detection device 100 determines the number of inspection flows which pass through a link pair by adding 1 to the number N of simultaneous occurrences of errors at the network 1c (N is an integer of 1 or more). For example, when the link pair which is identified by the error detection device 100 is, as illustrated in FIG. 8, L1 and L2 and there are two simultaneous occurrences of errors, the error detection device 100 makes the number of inspection flows which pass through the link pair L1 and L2 "3".

Below, using as an example the case where the link pair under inspection is L1 and L2, a procedure for determination of the inspection flows by the inspection coverage information 930 will be described:

Step 1: The error detection device 100 inspects the number of inspection devices under the links L1 and L2 based on the topology information 920c and device layout information 910c. There are three inspection devices under the link L1 and three inspection devices under the link L2. There is no overlap in the inspection devices.

Step 2: The error detection device 100 randomly extracts three inspection devices corresponding to the "number of simultaneous occurrences of abnormalities (2)+1" from under the link L1 and selects, for example, inspection devices 200a, 200b, and 200c in order 200a, 200b, 200c.

Step 3: The error detection device 100 randomly extracts three inspection devices corresponding to the "number of simultaneous occurrences of abnormalities (2)+1" from under the link L2 and selects, for example, inspection devices 200d, 200e, 200f, in the order of 200d, 200e, and 200f.

Step 4: The error detection device 100 combines the inspection devices in the order selected at steps 2 and 3 and determines the three flows F11 to F13 between the combinations of inspection devices of (200a, 200d), (200b, 200e), and (200c, 200f) as inspection flows.

The inspection flow F11 passes through the communication devices and links between the inspection devices 200a and 200d as follows:

200a-20f-(L5)-20b-(L1)-20a-(L2)-20c-(L8)-20i-200d

The inspection flow F12 passes through the communication devices and links between the inspection devices 200b and 200e as follows:

200b-20g-(L6)-20b-(L1)-20a-(L2)-20c-(L9)-20j-200e

The inspection flow F13 passes through the communication devices and links between the inspection devices 200c and 200f as follows:

200c-20h-(L7)-20b-(L1)-20a-(L2)-20c-(L10)-20k-200f4

The inspection flow F11 passes through the links L5, L1, L2, and L8. The inspection flow F12 passes through the links L6, L1, L2, and L9. The inspection flow F13 passes through the links L7, L1, L2, and L10. All of the inspection flows F11 to F12 flow through the links L1 and L2 under inspection. The other links are included in only one of the inspection flows F11 to F12. Therefore, if errors occur in all of the three inspection flows F11 to F13, it can be judged that there is an error in at least one of the links L1 and L2 common to the three inspection flows F11 to F13. Since there are two simultaneous occurrences of errors, there is a possibility of both the links L1 and L2 having errors. However, there is a possibility of one of the links L1 and L2 having an error and of a link other than the links L1 and L2 having an error. To identify at which of the links L1 and L2 there is an error, the inspection flows are changed as discussed below for the inspection.

When there is no error in even one of the three inspection flows F11 to F13, at least one of the three inspection flows F11 to F13 does not pass through an error location. Accordingly, the error detection device 100 judges that there are no errors at the links L1 and L2 through which all three of the inspection flows F11 to F13 pass and can remove the links L1 and L2 from the suspect locations.

Thus, by making the number of inspection flows the number of simultaneous occurrences of errors plus "1", the error detection device can judge if there is a suspect location in a link pair under investigation in accordance with a number of inspection flows one greater than the number of simultaneous occurrences of errors.

2.5. Inspection Coverage Information

FIG. 12 is a view illustrating one example of the inspection coverage information. The error detection device 100 of FIG. 3 uses the device layout information 910c, topology information 920c to generate the inspection coverage information 930c. The inspection coverage information 930c illustrated in FIG. 12 has a "flow" column 932c, "pairs of inspection devices" column 934c, and "communication devices" column 936c. The "flow" column 932c has the identifying names of the inspection flows which the error detection device 100 determines entered into them. The "pairs of inspection devices" column 934c has the inspection devices which send and receive inspection flows of the same entries entered into it. The entries of the pairs of inspection devices 934c are, at the left side, the source and, at the right side, the destination. The "communication devices" column 936c has the communication devices through which the inspection flows of the same entries pass entered into it.

The inspection flows of the inspection coverage information include a link pair under investigation and are generated in a number determined in accordance with the number of simultaneous occurrences of errors. In the example illustrated in FIG. 12, inspection flows F11 to F13 are generated as inspection flows including the link pair under investigation, that is, the link L1 (20a⇔ 20b) and the link L2 (20a⇔ 20c). Since there are two simultaneous occurrences of errors, the error detection device 100 generates two plus one, that is, three, inspection flows F11 to F13.

As explained above, when errors are found for all of the inspection flows F11 to F13, it is judged that at least one of the links L1 and L2 has an error, while when an error is not found for at least of the inspection flows F11 to F13, it is judged that there is no error in the links L1 and L2, but there is an error in another link, if there is the error. However, it is not possible to identify the link where the error occurred. Therefore, the link pair under investigation is changed from the link pair L1 and L2 to another link pair and all inspection flows which are required for inspecting the changed link pair under investigation are determined. For example, if focusing on the L5 and L6 link pair, the single inspection flow F14 (between 200a and 200b) which can pass through the L5 and L6 link pair is determined. When there are several inspection flows which pass through the link pair under investigation, the procedure for determining the inspection flows is performed for each link pair of each relay communication device so that an inspection flow passing through the link pair always remains.

If running inspection flows to the inspection devices 200a to 200c and the inspection devices 200d to 200f by full mesh, there become 3×3=9 inspection flows which flow through the link pair L1 and L2 under investigation. On the other hand, by determining the inspection flows by inspection devices which are paired from the inspection devices 200a to 200c under the communication device 20b and the inspection devices 200d to 200f under the communication device 20c so that there is no overlap in inspection devices, it is possible to reduce the number of inspection flows which pass through a link pair under investigation to "3". Further, even if there are two simultaneous occurrences of errors, it is possible to determine the inspection flows for judging at which links the errors occur.

2.6. Modification of Second Example of Communication Error Detection System

Figure 13:
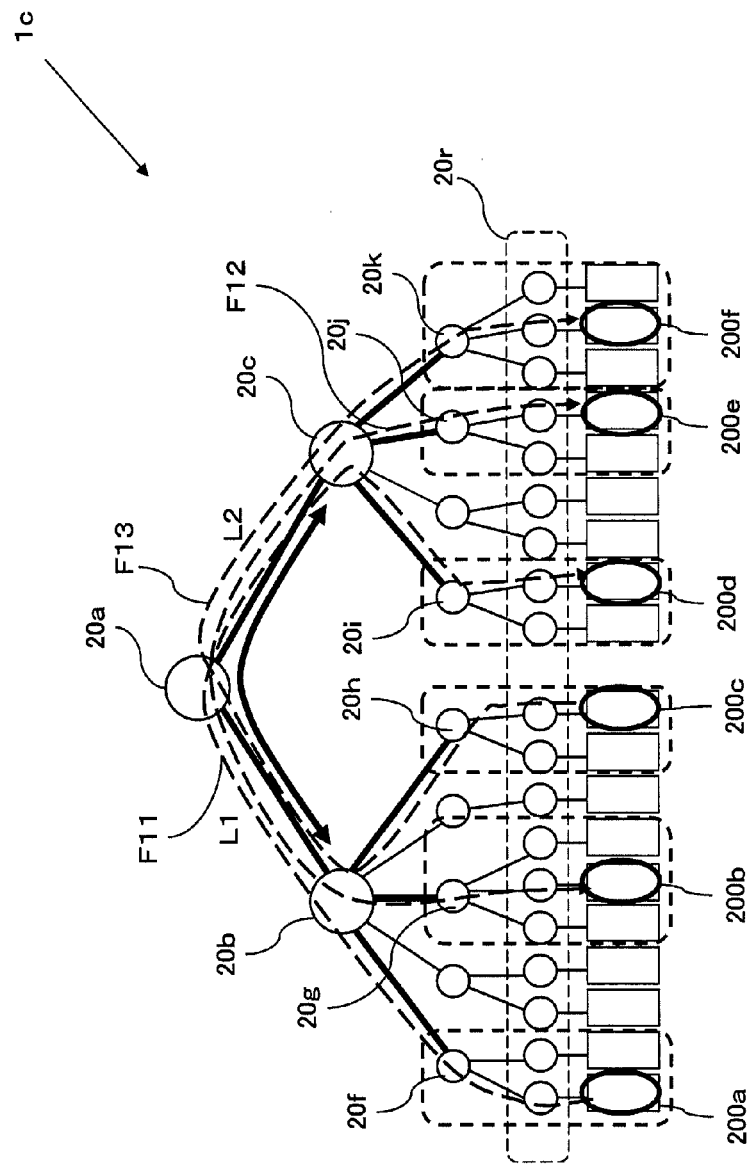
FIG. 13 is a view illustrating a modification of the second example of the configuration of a communication error detection system.

FIG. 13 is a view illustrating a modification of the second example of a communication error detection system. The communication devices 20a to 20c and 20f to 20k of the network 1c illustrated in FIG. 8, as illustrated in FIG. 13, may also have pluralities of communication devices 20r under the communication devices 20f to 20k. The inspection devices 200a to 200f illustrated in FIG. 8, as illustrated in FIG. 13, are connected to any communication devices under the communication devices 20f to 20k.

With the communication error detection system illustrated in FIG. 13 as well, for example, it is possible to reduce the number of inspection flows when there are two simultaneous occurrences of errors in a link pair L1 and L2 under investigation. In the example illustrated in FIG. 13, there are 10 inspection devices under the communication device 20b and nine inspection devices under the communication device 20c. For this reason, there are 10×9=90 inspection flows passing though the links L1 and L2. However, in the link pair L1 and L2 under investigation, three inspection flows (F11 to F13) are enough for two simultaneous occurrences of errors, so the inspection flows can be cut to 1/30.

As illustrated in FIG. 13, the network 1c illustrated in FIG. 8 can be applied to a multilayer hierarchical network by selection of the inspection devices to be connected to the communication devices of the lowest layer so as to run the inspection flows F11 to F13. Further, the greater the number of layers, the greater the number of inspection flows which pass through the link pair L1 and L2 under investigation, so the greater the effect of reduction of the inspection flows.

2.7. Processing for Determination of Inspection Flows

Figure 14:
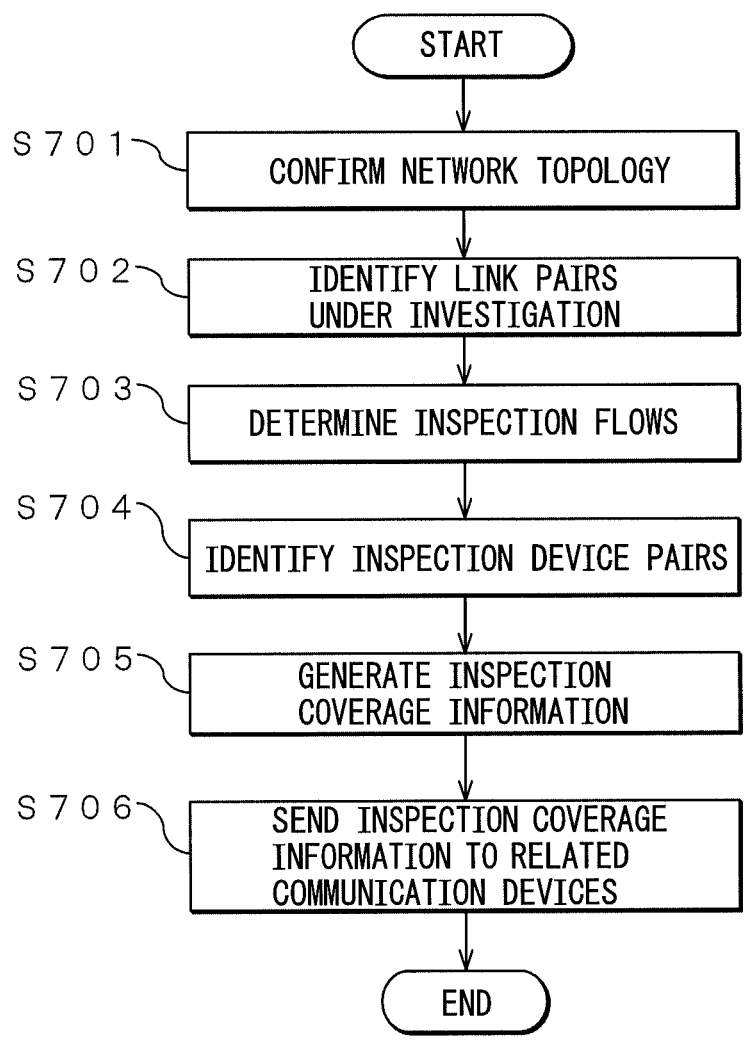
FIG. 14 is a flowchart illustrating an example of processing for determination of inspection flows by an error detection device.

FIG. 14 is a flowchart illustrating one example of the processing for determination of inspection flows by an error detection device. FIG. 14 will be used to explain, as processing for determination of inspection flows, processing for generation of inspection coverage information and processing for transmission of inspection coverage information.

First, the error detection device 100 refers to the device layout information 910c and topology information 920c and confirms the network topology illustrated in FIG. 8 (S701). The error detection device 100 identifies, from the network topology, a link pair under investigation by which a communication device acting as a relay between two communication devices is connected to them (S702). In the example illustrated in FIG. 8, the link pair L1 and L2 by which the communication device 20a which acts as a relay between the two communication devices 20b and 20c is connected to them is made the link pair under investigation.

The error detection device 100 determines the inspection flows which pass over routes in the network so as to minimize the number of inspection flows which pass through the link pair (S703).

The error detection device 100 identifies the pairs of inspection devices which send and receive the determined inspection flows (S704). In the example illustrated in FIG. 8, for example, the number of simultaneous occurrences of errors is two, so the pairs of inspection devices which send and receive the inspection flows become (200a, 200d), (200b, 200e), and (200c, 200f).

Next, the error detection device 100 generates inspection coverage information which includes the inspection flows and the pair of inspection devices for sending and receiving the inspection flows (S705). Further, the error detection device 100 sends the inspection coverage information 930 to the communication devices of the sources in the pairs of inspection devices of the inspection coverage information (S706).

In this way, the error detection device 100 determines inspection flows which detects errors in communication in a network which has a plurality of communication devices and sends the inspection coverage information 930 to the communication devices.

2.8. Processing for Judging Abnormal Links

Figure 15:
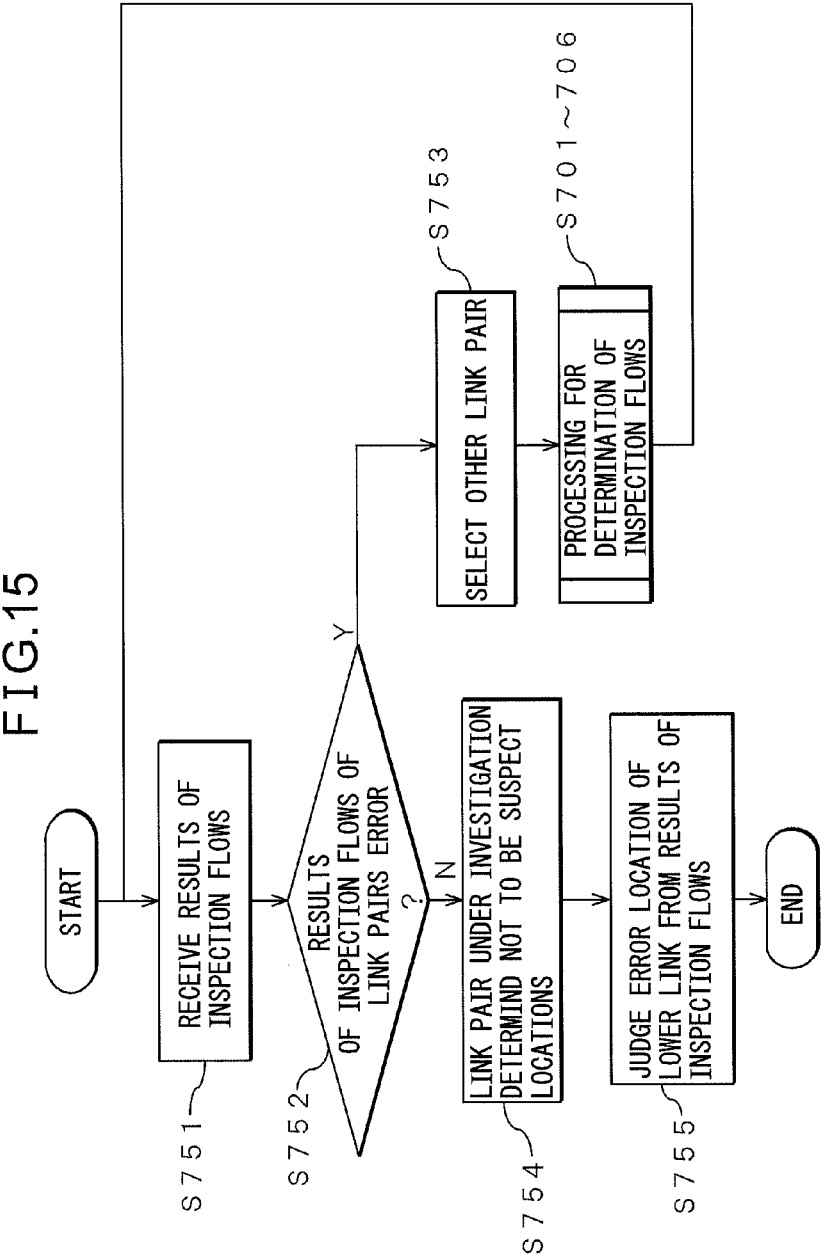
FIG. 15 is a flowchart illustrating an example of processing for determination of inspection flows by abnormal link judgment processing.

FIG. 15 is a flowchart illustrating one example of processing for judgment of error links. An inspection device sends inspection flows in accordance with the inspection coverage information which is sent from the error detection device 100, receives the results of the inspection flows, and sends them to the error detection device 100. The error detection device 100 receives the results of the inspection flows (S751).

The error detection device 100 judges if the results of the inspection flows indicate an error (S752). In the example illustrated in FIG. 8, the error detection device 100 judges if there are errors in the inspection flows F11 to F13 which pass through the link pair L1 and L2.

When all of the results of the inspection flows are that there is an error (S752, Y), it is learned that one or both of the link pair under investigation has an error. However, it is not possible to identify the error link. Therefore, another link pair including one of the link pair under investigation is inspected. For this reason, another link pair is selected (S753). For example, when all of the inspection flows F11 to F13 of the link pair L1 and L2 under investigation indicate errors, the error detection device 100 selects other link pairs L1 and L3, L1 and L4, L2 and L3, and L2 and L4. The error detection device 100 performs processing for determining the inspection flows for each selected link pair (S701 to 706) and then returns to S751.

When there is not even one result of the inspection flows which indicates an error (S752, N), the error detection device 100 judges that the link pair under investigation is not the suspect locations (S754). For example, in the example of FIG. 8, the link pair L1 and L2 is determined not to be the suspect locations. Further, the error detection device 100 judges the error locations of the lower links from the results of the inspection flows (S755) and ends the processing for judgment of abnormal links.

3. Third Example of Communication Error Detection System

Figure 16:
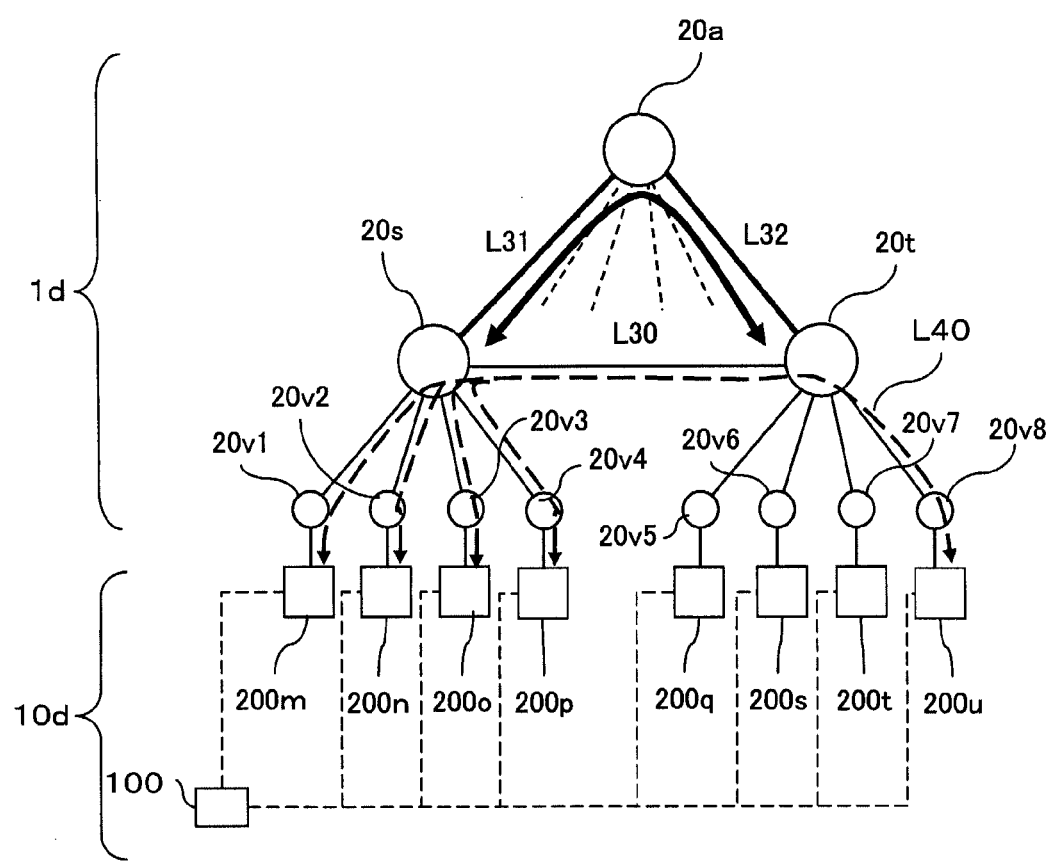
FIG. 16 is a view illustrating a third example of the configuration of a communication error detection system.

FIG. 16 is a view illustrating a third example of a communication error detection system. The communication error detection system 10d illustrated in FIG. 16 has an error detection device 100 and inspection devices 200m to 200u. A network 1d is a hierarchical network which is comprised of an uppermost first layer of a communication device 20a, a second layer of communication devices 20s and 20t, and a third layer of a plurality of communication devices 20a, 20s, 20t, and 20v1 to 20v8. A designated route L40 is a route designated between communication devices passing through a link L30. The inspection devices 200m to 200u are connected to any of the plurality of communication devices 20v1 to 20v8.

FIG. 17 is a view illustrating one example of route information. The designated route information 950 illustrated in FIG. 17 is information illustrating the route designated between communication devices together with the inspection devices. The designated route information 950 has an "inspection devices" column 952 and a "designated routes" column 954. In the "inspection devices" column 952, pairs of inspection devices which are arranged at the two ends of designated routes are entered. In the "designated routes" column 954, communication devices which act as relays in the designated routes are entered. A designated route which is entered into the "designated routes" column 954 of FIG. 17 corresponds, in one example, to the designated route L40 of FIG. 16.

When the link pair to be inspected is comprised of the links L31 and L32, the designated route L40 does not pass through the link pair L31 and L32, but is a route connecting a pair of inspection devices. Therefore, the error detection device 100 excludes the inspection devices at the two ends of the designated route L40 which does not pass through the links L31 and L32 from the inspection devices for the inspection flows. That is, the designated route which is designated by the designated route information 950 is excluded from the inspection flows under inspection. Due to this, it is possible to avoid formation of an inspection flow which does not pass through the link pair of the links L31 and L32.

4. Example of Equalization of Selection of Inspection Devices

Figure 18:
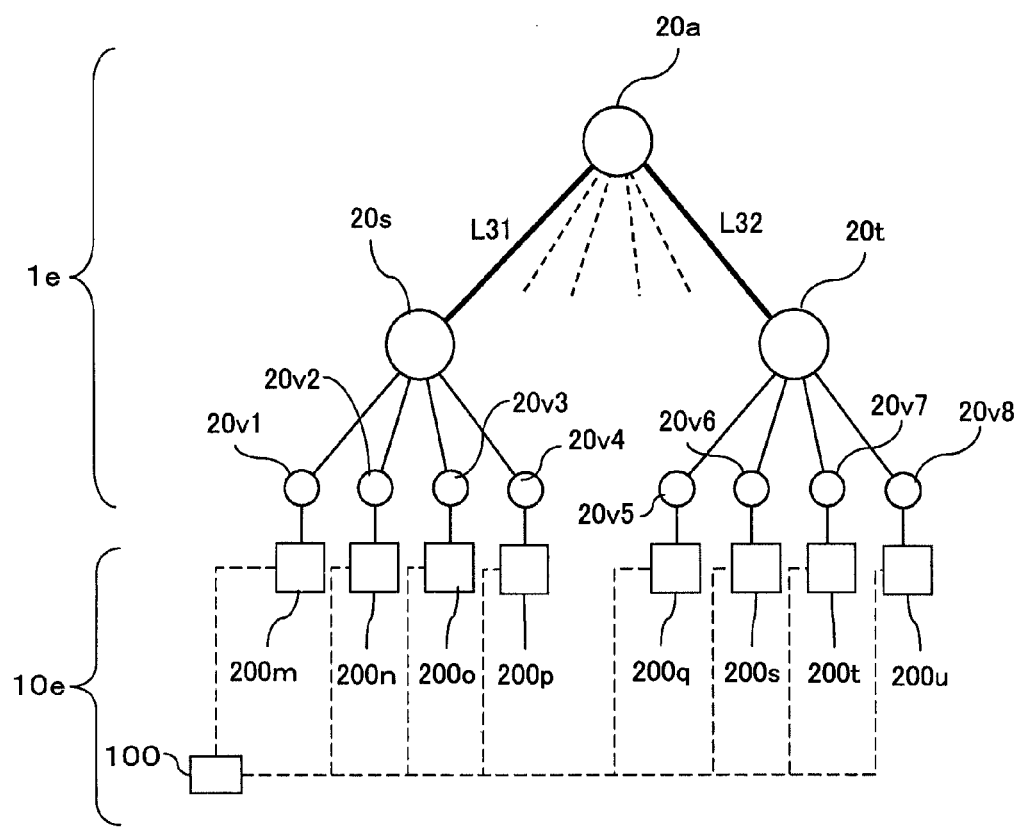
FIG. 18 is a view illustrating a fourth example of the configuration of a communication error detection system.

FIG. 18 is a view illustrating a fourth example of a communication error detection system. The communication error detection system 10e illustrated in FIG. 18 has an error detection device 100 and inspection devices 200m to 200u. The network le has a plurality of communication devices 20a, 20s, 20t, and 20v1 to 20v8. The inspection devices 200m to 200u are connected to any of the plurality of communication devices 20v1 to 20v8.

In FIG. 18, using as an example the case where the link pair under investigation is comprised of the links L31 and L32, the equalization of selection of inspection devices in the processing for determination of the inspection flows will be discussed. FIG. 19 shows an example of device log information. The device log information 960 has an "inspection devices" column 962 and a "times selected" column 964. In the "inspection devices" column 962, the names of the inspection devices are entered, while, in the "times selected" column 964, the number of times the inspection device of each entry was selected are entered.

The device log information 960a illustrated in FIG. 19 is device log information before the selection of the inspection devices by the error detection device 100. The error detection device 100 equalizes the selection of inspection devices by the following method.

4.1. Equalization by Past Times Extracted (Fixed Extraction)

The method is a method for fixed extraction of selected devices from inspection devices with low past times extracted. In the system illustrated in FIG. 18, the error detection device 100 selects from the inspection devices 200m to 200p the three inspection devices 200o, 200p, and 200n corresponding to (maximum allowable number of simultaneous occurrences of errors +1) in order starting from the lowest times extracted. The error detection device 100 selects three inspection devices 200u, 200s, and 200t from the inspection devices 200p to 200u in the order of the lowest times selected up. By selection of the inspection devices, the three inspection flows of (200o, 200u), (200p, 200s), and (200n, 200t) are determined. The device log information 960a of FIG. 19 is updated to the device log information 960b after this selection.

4.2. Weighting by Past Times Extracted (Extraction by Probability)

According to the method, the selected inspection devices are extracted, using the weighted past times, extraction by probability. In the case of the present example, the error detection device 100 selects, from the inspection devices 200m to 200p, three inspection devices corresponding to (maximum allowable number of simultaneous occurrences of abnormalities+1), by the probability ratio of the reciprocal of the times extracted, that is, 1/3:1/2:1:1, in this example, 200o, 200p, and 200n. Further, the error detection device 100 extracts, from the inspection devices 200p to 200u, three inspection device by the probability ratio of the reciprocal of the times extracted, that is, 1/5:1/2:1/4:1, in this example, 200s, 200u, and 200q. Due to this, it decides on the three inspection flows of (200o, 200s), (200p, 200u), and (200n, 200q). The device log information 960a of FIG. 19, after the above selection, is updated to the device log information 960c.

By utilizing the information of the past times extracted of the inspection devices, equalization of the number of inspection devices selected becomes possible.

Figure 20:
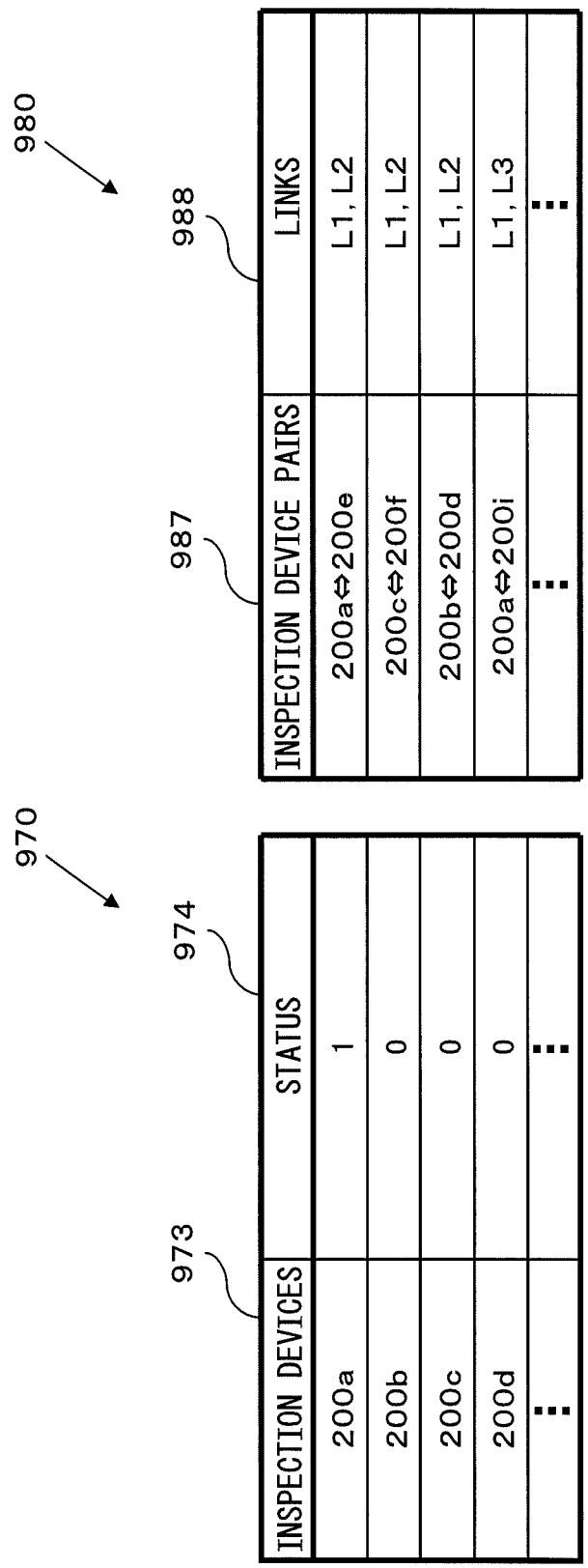
FIG. 20 is a view illustrating an example of inspection device status information and device link information.

5. Example of Re-determination of Inspection Flows at Time of Inspection Device Error FIG. 20 is a view illustrating an example of device status information and device link information. The inspection device status information 970 has an "inspection devices" column 973 and "status information" column 974. The "status information" column 974 has states illustrating if the inspection devices illustrated in the entries indicate a normal state ("0") or an error state ("1"). The device link information 980 has an "inspection device pairs" column 987 and a "links" column 988 through which inspection flows by the inspection devices of the same records pass.

Based on the communication error detection system 10c of FIG. 8 and the network 1c, the re-determination of the inspection flows at the time of errors in the inspection devices will be explained. The communication error detection system 10c illustrated in FIG. 8 has already determined the inspection flows for the link pairs under investigation. The correspondence management information of the pairs of inspection devices of the determined inspection flows and the link pairs under inspection leading to determination of the pairs of inspection devices is managed as the device link information 980 of FIG. 20.

When the error detection device 100, for example, detects a failure in the inspection device 200a by periodic polling of the inspection devices or reception of an SNMP (Simple Network Management Protocol) trap from an inspection device, the inspection flows are re-determined. First, the error detection device 100 extracts the link pairs leading to selection of the inspection device 200a at which the failure occurred based on the device link information 980 of the pairs of inspection devices and links. In the case of the examples, the link pairs (L1, L2), (L1, L3) . . . in which links by which the inspection device 200a transmits inspection flows are included are extracted. The error detection device 100 re-determines the inspection flows for these link pairs.

The error detection device 100 takes note of the extracted link pairs and determines new inspection flows for each under conditions not utilizing the inspection device 200a, for example, by the processing for determination of the inspection flows which was explained in FIG. 14. By holding and referring to the related information with the noted link pairs leading to selection of the inspection device in which the failure occurred. Thus, the error detection device 100 can re-determine only the inspection flows which are affected by the error even at the time of a fault in an inspection device.

All examples and conditional language recited above were intended for pedagogical purposes to aid the reader in understanding the principles of the disclosure and the concepts contributed by the inventor to furthering the art and are to be construed as being without limitation to such specifically recited examples and conditions. Nor does the organization of such examples in the specification relate to a showing of the superiority and inferiority of the invention. Although the embodiments of the disclosure have been described in detail, it should be understood that the various changes, substitutions, and alterations could be made hereto without departing from the spirit and scope of the disclosure.

The invention claimed is:

1. An error detection device comprising:
a control unit configured to:
identify a link pair having a first link connecting a first communication device to a third communication device and a second link connecting a second communication device to the third communication device,
identify (N+1) number of first inspection devices that connect to the first communication device through third links, and (N+1) number of second inspection devices that connect to the second communication device through fourth links, the number N being the number of links where communication errors simultaneously occur,
determine (N+1) number of inspection flows between (N+1) number of inspection device pairs by relating on a one-to-one basis the (N+1) number of first inspection devices to the (N+1) number of second inspection devices,
generate inspection coverage information that includes the determined inspection flows, and
analyze each of the inspection flows that is transmitted by one inspection device of each of the inspection device pairs and received by the other one inspection device of each of the inspection device pairs to determine whether the link pair has an communication error;
a storage unit that stores the inspection coverage information; and
a communication unit that sends the inspection coverage information from the control unit to the one inspection device of each of the inspection device pairs.

2. The error detection device according to claim 1, wherein the control unit determines the inspection device pairs not to overlap with each other.

3. The error detection device according to claim 1,
further comprising route information that designates a route by designating an inspection device pair and links connecting the designated inspection device pair;
wherein the control unit determines the inspection flows based on the route information.

4. The error detection device according to claim 1,
further comprising device log information that includes numbers of times by which the inspection devices are selected as the inspection device pairs;
wherein the control unit refers to the device log information to select inspection devices with low numbers of times selected or inspection devices with probability ratios that are inversely proportional to past numbers of times extracted so as to identify the inspection device pairs.

5. The error detection device according to claim 1,
further comprising inspection device status information that manages statuses of the inspection devices and device link information that manages correspondence relationships between the inspection device pairs and links connecting each inspection device of the inspection device pairs;
wherein when the inspection device status information indicates that a fault has occurred in an inspection device, the control unit refers to the device link information, removes the inspection device in which the fault has occurred, and re-determines the inspection flows that detects the communication error of the link pair.

6. A communication error detection system comprising:
a plurality of communication devices;
a plurality of inspection devices including first inspection devices and second inspection devices;
an error detection device comprising a control unit configured to:
identify a link pair having a first link connecting a first communication device to a third communication device and a second link connecting a second communication device to the third communication device, the first to third communication devices selected among the plurality of communication devices,
identify (N+1) number of the first inspection devices that connect to the first communication device through third links, and (N+1) number of the second inspection devices that connect to the second communication device through fourth links, the number N being the number of links where communication errors simultaneously occur,
determine (N+1) number of inspection flows between (N+1) number of inspection device pairs by relating on a one-to-one basis the (N+1) number of first inspection devices to the (N+1) number of second inspection devices,
generate inspection coverage information that includes the determined inspection flows, and
analyze each of the inspection flows that is transmitted by one inspection device of each of the inspection device pairs and received by the other one inspection device of each of the inspection device pairs to determine whether the link pair has an communication error;
a storage unit that stores the inspection coverage information; and
a communication unit that sends the inspection coverage information to one device of each of the inspection device pairs.

7. The communication error detection system according to claim 6, wherein the control unit identifies the inspection device pairs that do not overlap with each other from the plurality of inspection devices.

8. The communication error detection system according to claim 6, wherein the error detection device comprises route information that designates a route by designating an inspection device pair and links connecting the designated inspection device pair, and the control unit designates the inspection flows based on the route information.

9. The communication error detection system according to claim 6, wherein
the error detection device comprises device log information that includes numbers of times by which the inspection devices are selected as the inspection device pairs, and
the control unit refers to the device log information to select inspection devices with low numbers of times selected or inspection devices with probability ratios that are inversely proportional to past numbers of times extracted so as to identify the pairs.

10. The communication error detection system according to claim 6, wherein
the error detection device comprises inspection device status information that manages statuses of the inspection devices and device link information that manages correspondence relationships between the inspection device pairs and the link pairs and links connecting each inspection device of the inspection device pairs, and when the inspection device status information indicates that a fault has occurred in an inspection device, the control unit refers to the device link information, removes the inspection device in which the fault has occurred, and re-determines the inspection flows that detects the communication error of the link pair.

11. A communication error detection method comprising:
identifying, by a error detection device, a link pair having a first link connecting a first communication device to a third communication device and a second link connecting a second communication device to the third communication device;
identifying, by the error detection device, (N+1) number of first inspection devices that connect to the first communication device through third links, and (N+1) number of second inspection devices that connect to the second communication device through fourth links, the number N being the number of links where communication errors simultaneously occur;
determining, by the error detection device, (N+1) number of inspection flows between (N+1) number of inspection device pairs by relating on a one-to-one basis the (N+1) number of first inspection devices to the (N+1) number of second inspection devices;
generating, by the error detection device, inspection coverage information that includes the determined inspection flows; and
analyzing, by the error detection device, each of the inspection flows that is transmitted by one inspection device of each of the inspection device pairs and received by the other one inspection device of each of the inspection device pairs to determine whether the link pair has an communication error.

12. The communication error detection method according to claim 11, wherein the determining includes selecting the inspection device pairs not to overlap with each other.

13. The communication error detection method according to claim 11, wherein the determining includes determining the inspection flows based on route information, the route information designating a route by designating an inspection device pair and links connecting the designated inspection device pair.

14. The communication error detection method according to claim 11, wherein the determining includes selecting the inspection device pairs from inspection devices with low numbers of times selected or inspection devices with probability ratios that are inversely proportional to past numbers of times extracted by referring to device log information that includes numbers of times by which the inspection devices are selected as the inspection device pairs.

15. The communication error detection method according to claim 11, wherein the determining includes removing an inspection device in which a fault has occurred and re-determining the inspection flows by referring to device link information, the device link information managing correspondence relationships between the inspection device pairs and the link pairs, when inspection device status information indicates that the fault has occurred in the inspection device, the inspection device status information managing the statuses of the inspection devices.

16. A machine-readable, non-transitory medium storing a program that causes a computer to perform a method, the method comprising:
identifying a link pair having a first link connecting a first communication device to a third communication device and a second link connecting a second communication device to the third communication device;
identifying (N+1) number of first inspection devices that connect to the first communication device through third links, and (N+1) number of second inspection devices that connect to the second communication device through fourth links, the number N being the number of links where communication errors simultaneously occur;
determining (N+1) number of inspection flows between (N+1) number of inspection device pairs by relating on a one-to-one basis the (N+1) number of first inspection devices to the (N+1) number of second inspection devices;
generating inspection coverage information that includes the determined inspection flows; and
analyzing each of the inspection flows that is transmitted by one inspection device of each of the inspection device pairs and received by the other one inspection device of each of the inspection device pairs to determine whether the link pair has an communication error.

17. The medium according to claim 16, wherein the determining includes selecting the inspection device pairs not to overlap with each other.

18. The medium according to claim 16, wherein the determining includes determining the inspection flows based on route information, the route information designating a route by designating an inspection device pair and links connecting the designated inspection device pair.

19. The medium according to claim 16, wherein the determining includes selecting the inspection device pairs from inspection devices with low numbers of times selected or inspection devices with probability ratios that are inversely proportional to past numbers of times extracted by referring to device log information that includes numbers of times by which the inspection devices are selected as the inspection device pairs.

20. The medium according to claim 16, wherein the determining includes removing an inspection device in which a fault has occurred and re-determining the inspection flows by referring to device link information, the device link information managing correspondence relationships between the inspection device pairs and the link pairs, when inspection device status information indicates that the fault has occurred in the inspection device, the inspection device status information managing the statuses of the inspection devices.

* * * * *

UNITED STATES PATENT AND TRADEMARK OFFICE
CERTIFICATE OF CORRECTION

| | | |
|---|---|---|
| PATENT NO. | : 8,595,571 B2 | Page 1 of 1 |
| APPLICATION NO. | : 13/110112 | |
| DATED | : November 26, 2013 | |
| INVENTOR(S) | : Takeshi Yasuie et al. | |

It is certified that error appears in the above-identified patent and that said Letters Patent is hereby corrected as shown below:

On the Title page, in Column 2, item 56 (Other Publications), Line 1, Delete "deradation" and insert -- degradation --, therefor.

In the Claims
In Column 18, Line 34, In Claim 18, after "to" insert -- claim --.
In Column 18, Line 39, In Claim 19, after "to" insert -- claim --.

Signed and Sealed this
First Day of April, 2014

Michelle K. Lee
*Deputy Director of the United States Patent and Trademark Office*